(No Model.)
J. CARSON.
COMBINED SQUARE, MITER BEVEL, AND LEVEL.
No. 363,988. Patented May 31, 1887.
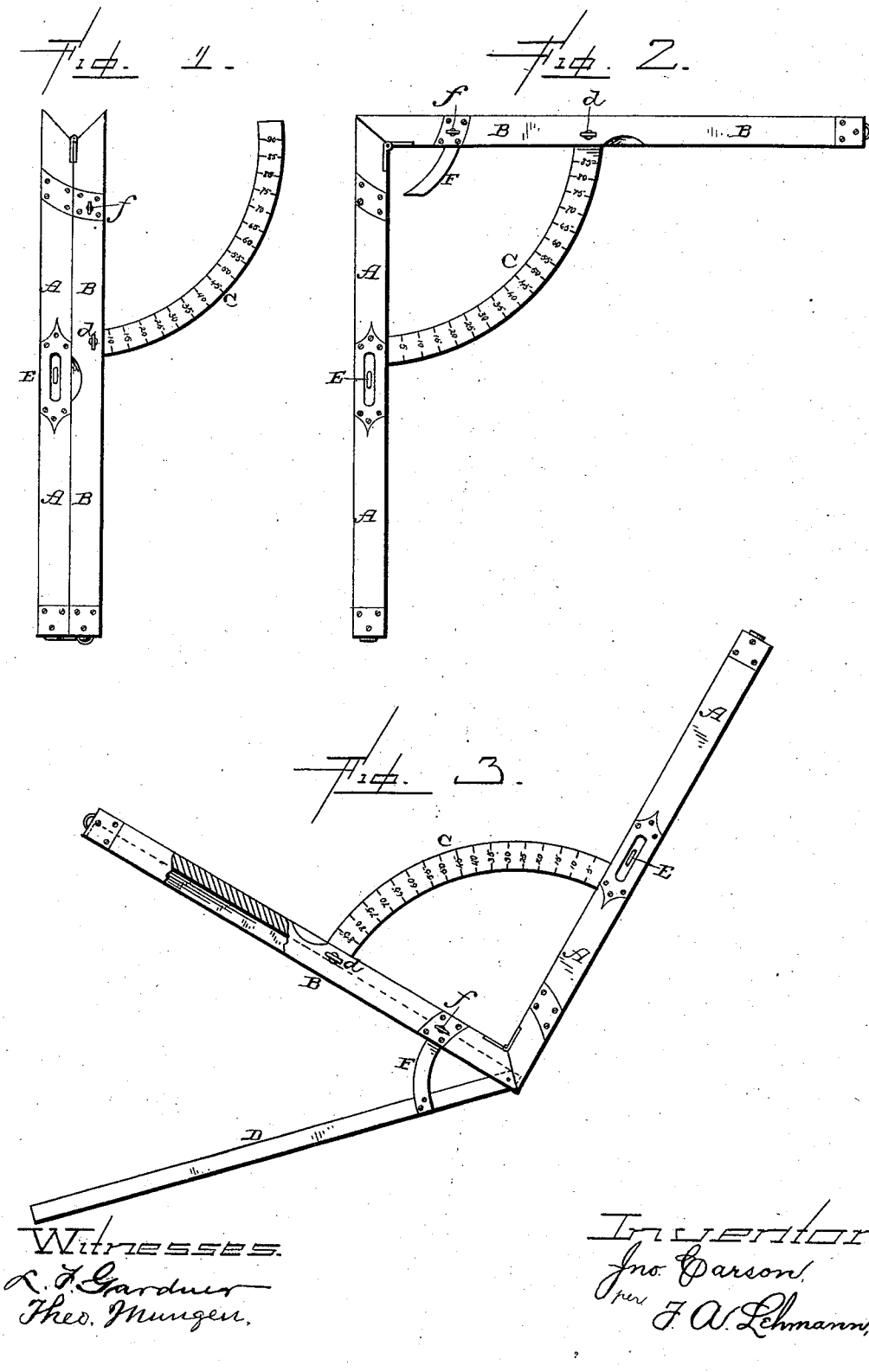

UNITED STATES PATENT OFFICE.

JOHN CARSON, OF BOONTON, NEW JERSEY.

COMBINED SQUARE, MITER-BEVEL, AND LEVEL.

SPECIFICATION forming part of Letters Patent No. 363,988, dated May 31, 1887.

Application filed December 16, 1886. Serial No. 221,813. (No model.)

*To all whom it may concern:*

Be it known that I, JOHN CARSON, of Boonton, Morris county, New Jersey, have invented certain new and useful Improvements in Combined Levels, Squares, and Miter-Bevels, of which the following is a specification.

My invention relates to an improvement in combined level, square, and miter-bevel; and it consists in the combination of two arms, which are pivoted together at one end, a graduated arc, which is secured to one arm and passed through an opening in the other, and a miter bevel or arm, which is pivoted to one of the arms and fits into a suitable socket prepared therefor, which has secured to it an arc or guide for holding it in any desired position, all of which will be more fully described hereinafter.

The object of my invention is to produce a combined instrument which is adapted for measuring angles in either horizontal or vertical planes, for leveling and squaring objects, for forming bevels, and many other such uses, and is particularly intended for the use of plasterers and masons.

Figure 1 is a side elevation of an instrument embodying my invention, showing the parts closed together. Fig. 2 is a similar view showing the instrument partially opened so as to form a square. Fig. 3 is a similar view showing the instrument opened.

A B represent two arms, which are hinged together at one end, and which have their hinged ends beveled away, as shown, so that when the two parts are opened outward, as shown in Figs. 2 and 3, they form a square. When closed together, as shown in Fig. 1, the two arms, A B, are held together by means of a suitable hook, which is applied to their free ends, as shown. The arm A is provided with a level, E, and secured to this arm A at any suitable point is the graduated segment C. This segment passes through an opening in the arm B, in the usual manner, and the arm B is fastened in any desired position upon the segment by means of a set-screw, *d*.

In the outer side of the arm B is formed a suitable socket or groove, and pivoted to this arm B and fitting in this groove is the miter-bevel D, to which the curved guide F is secured. This miter-bevel D is connected by a rule-joint with the arm B, and can be opened freely outward, as shown in Fig. 3. When closed, its outer edge comes just flush with the outer edge of the arm B, and the segment C passes through openings made in both the arm and the bevel D. The bevel D is held in any desired relation to the arm B by means of a set-screw, *f*. When the instrument is closed, as shown in Fig. 1, it forms a level, a rule, and a measure. When the parts are arranged as shown in Fig. 2, a square, a level, a rule, and a measure are formed. When the parts are arranged as shown in Fig. 3, they are especially adapted for obtaining bevels.

Having thus described my invention, I claim—

The combination of the arms A B, hinged together at one end, the segment C, and the miter-bevel D, which is hinged to the arm B and provided with a guide, F, substantially as shown and described.

JOHN CARSON.

Witnesses:
PIERSON SMITH,
MATHIAS ROSE.